(12) United States Patent  (10) Patent No.: US 9,205,848 B2
Schiefer  (45) Date of Patent: Dec. 8, 2015

(54) EXPANDABLE TABLE (71) Applicant: SIEMENS AKTIENGESELLSCHAFT, Munich (DE)

(72) Inventor: Benno Schiefer, Duesseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/361,355

(22) PCT Filed: Oct. 1, 2012

(86) PCT No.: PCT/EP2012/069312
§ 371 (c)(1),
(2) Date: May 29, 2014

(87) PCT Pub. No.: WO2013/079245
PCT Pub. Date: Jun. 6, 2013

(65) Prior Publication Data
US 2014/0338572 A1  Nov. 20, 2014

(30) Foreign Application Priority Data
Nov. 29, 2011 (DE) .......................... 10 2011 087 346

(51) Int. Cl.
*B61D 37/00* (2006.01)
*A47B 1/05* (2006.01)
(Continued)

(52) U.S. Cl.
CPC . *B61D 37/00* (2013.01); *A47B 1/04* (2013.01); *A47B 1/05* (2013.01); *A47B 5/00* (2013.01); *B60N 3/001* (2013.01); *B60N 3/002* (2013.01); *A47B 5/006* (2013.01)

(58) Field of Classification Search
CPC ............. A47B 5/00; A47B 5/006; A47B 1/04
USPC ................. 108/38, 64, 69; 312/313, 322, 323
See application file for complete search history.

(56) References Cited

U.S. PATENT DOCUMENTS 69,799 A * 10/1867 Greene ........................... 108/38
796,600 A * 8/1905 McLane ..................... 312/234.2
(Continued)

FOREIGN PATENT DOCUMENTS

DE   1819486 U   10/1960
DE   2608231 A1   9/1977
(Continued)

OTHER PUBLICATIONS

VELARO—FOTO, http://h2.abload.de/img/velaro12e9er.jpg, Nov. 10, 2011.

*Primary Examiner* — Matthew Ing
(74) *Attorney, Agent, or Firm* — Laurence Greenberg; Werner Stemer; Ralph Locher (57) ABSTRACT

An expandable table includes a basic table leaf and at least one supplementary table leaf which can be positioned next to the basic table leaf. In order to be able to expand the table to a relatively great extent in spite of having a narrow basic table leaf, the at least one supplementary table leaf is constructed as an insert leaf which can be guided obliquely downwards beneath the basic table leaf. The insert leaf has a respective component of a respective pivot bearing at its lower end on both transverse sides and a respective further component of the pivot bearing, which is connected to the basic table leaf, engages into the component in an extended condition of the insert leaf to complete the pivot bearing.

16 Claims, 8 Drawing Sheets

(51) Int. Cl.
*B60N 3/00* (2006.01)
*A47B 1/04* (2006.01)
*A47B 5/00* (2006.01)

(56) References Cited

U.S. PATENT DOCUMENTS

| | | | | |
|---|---|---|---|---|
| 2,037,413 | A | * | 4/1936 | Gloekler .................... 312/138.1 |
| 2,767,042 | A | * | 10/1956 | Kesling ......................... 312/313 |
| 4,841,601 | A | * | 6/1989 | Taima ............................. 16/361 |
| 5,050,929 | A | * | 9/1991 | Gueringer et al. ............ 297/145 |
| 5,050,944 | A | * | 9/1991 | Fricano ......................... 312/323 |
| 6,988,780 | B2 | * | 1/2006 | Anderson et al. ............. 312/323 |
| 7,201,439 | B2 | | 4/2007 | Schweizer |
| 7,836,549 | B1 | * | 11/2010 | McGuigan ...................... 16/266 |
| 2002/0093275 | A1 | * | 7/2002 | Waisbrod et al. ............. 312/322 |
| 2009/0078169 | A1 | | 3/2009 | Osborne et al. |

FOREIGN PATENT DOCUMENTS

| | | |
|---|---|---|
| DE | 102004024559 A1 | 12/2005 |
| EP | 1514760 A1 | 3/2005 |
| FR | 2845112 A1 | 4/2004 |
| GB | 838328 A | 6/1960 |

* cited by examiner

EXPANDABLE TABLE

BACKGROUND OF THE INVENTION

Field of the Invention

The invention relates to an expandable table having a basic table leaf and having at least one supplementary table leaf which can be placed next to the basic table leaf.

An expandable table of this type is known from Internet publication "http.//h2.abload.de/img/velaro12e9er.jpg". Said publication shows an expandable table in a coach of the Siemens "VELARO E" railway vehicle. The known table is provided with a basic leaf which is supported on the one side on a side wall of the coach of the railway vehicle and on the other side on a table column. The known table is arranged between two pairs of seats which are located opposite one another and comprises on each side of the basic table leaf a further supplementary table leaf in each case lying in a row with a supplementary table leaf. All the supplementary table leaves of the known expandable table are provided with folding hinges such that when not required the supplementary table leaves are simply folded onto the basic table leaf. Advantages of said embodiment are the relatively favorable production costs and a development where, in the folded-out state, all the supplementary table leaves form a closed table surface almost without a gap. However, when the supplementary table leaves are folded back the effect of the known table is not very appealing, it is only usable in said state in a restricted manner and access to the seating area is restricted on account of the width of the basic table leaf.

BRIEF SUMMARY OF THE INVENTION

The object underlying the invention is to propose an expandable table which comprises a basic table leaf with a comparatively narrow width and which, in the expanded state, is relatively wide with the achievement of a closed table surface.

To achieve said object, in the case of an expandable table of the type specified in the introduction, the at least one supplementary table leaf is realized according to the invention as an insert leaf which is guidable in an obliquely downward manner under the basic table leaf and, on each of two transverse sides at its bottom end, bears one component in each case of a pivot bearing; in each case a further component of the pivot bearing which is connected to the basic table leaf engages in the component with the insert leaf extended, thereby completing the pivot bearing.

Expandable tables, which can be enlarged using at least one insert leaf, are certainly known from the domestic sector, however the insert leaves in the case of said tables are inserted horizontally. In this case, the insert leaves are held in the extended state more often than not by means of braces.

A substantial advantage of the table according to the invention is that, in spite of the possibility for expansion to a suitable width, it is able to be realized in a relatively narrow manner with respect to its basic table leaf. This can be put down to the fact that the insert leaf is guidable in an obliquely downward manner under the basic table leaf and consequently can then itself be wider than half the width of the basic table leaf if a further correspondingly wide insert leaf is provided on the opposite side of the basic table leaf. In this case, a flat, closed table leaf is achievable with the insert leaf extended. When the table is used, for example, in a railway vehicle, this involves the further advantage that the seats at the table are able to be taken up in a comparatively comfortable manner.

With regard to the development of its pivot bearing, it is possible to realize the table according to the invention in various ways. It is deemed to be particularly advantageous above all with regard to a structurally simple embodiment when the one component of the pivot bearing is formed by a circular recess and the other component is formed by two guide rollers which are located diametrically opposite one another.

The table according to the invention is particularly advantageous when the circular enlargement lies centrally within the course of a guide groove which is open at least at one end and guide shoulders which extend obliquely downward to be accommodated in the guide grooves from the open end thereof are present below the basic table leaf. Consequently a design is achieved which manages with a small lateral space requirement because the guide grooves lie inside the insert leaf—and not outside—and the guide shoulders and the guide rollers engage in the insert leaf. This means that small gap spacing's are made possible between adjacent insert leaves. This can be put down to the fact that guide grooves that are necessary according to the invention are provided in the narrow sides of the insert leaf, whilst lateral holding devices are provided in each case with a guide shoulder and with guide rollers. The lateral holding devices can consequently be realized in a relatively narrow manner, which results in the small lateral space requirement.

For simple handling of the insert leaf it is advantageous for the insert leaf to comprise at its bottom end, at least within the region of the guide groove, an alignment recess in such a manner that the insert leaf, when pivoting back into a position pointing obliquely downward, is placed against the guide shoulder thus aligning the guide groove with respect to the guide shoulder.

In order to create a user-friendly design of the table according to the invention in a structurally simple manner, the guide groove, in its portion from the circular recess as far as up to the top end of the insert leaf, is realized with a c-shaped cross section thus forming in each case a lateral receiving channel for the oppositely situated guide rollers and thus forming an elongated slot for accommodating the guide shoulder; in addition the guide groove in its portion between the circular recess and the bottom end of the insert leaf is realized with a rectangular cross section with a width which corresponds to the width of the guide shoulder. As a result, the insert leaf is also prevented from being pulled away from the table basic leaf in the horizontal direction.

In the case of the table according to the invention, the spacing between in each case two guide rollers is dimensioned such that the wrap diameter thereof corresponds to the diameter of the circular recess. As a result, the guide rollers, when reaching the circular recess, abut precisely against the walls thereof in an advantageous manner and allow the insert leaves to be rotated or pivoted in a controlled manner.

The respective guide shoulder and each of the two guide rollers can be mounted on the table according to the invention in a different manner; it is considered to be particularly advantageous, however, when two lateral holding devices, which comprise in each case one guide shoulder and two guide rollers, are mounted below the basic table leaf.

In detail, the table according to the invention is realized in an advantageous manner such that the two guide rollers are mounted in each case in such a manner on the holding devices that they fit closely under the surface plane of the basic table leaf; in each case the circular recess of the guide groove is positioned in such a manner in the vicinity of the open end of the guide groove and the guide shoulder is positioned in each case in such a manner on the holding device that the insert leaf pivots freely when the circular recess lies within the region of the guide rollers. In the case of such an arrangement of the guide rollers and of the circular recess of the guide groove, optimum conditions are created with regard to the design of a table surface that is flat overall.

In said context it is considered advantageous when, to achieve a continuous smooth surface of the expandable table, the insert leaf is indented on its top side in the region between the circular recesses in such a manner and the basic table leaf is indented on its bottom side in the region between the guide rollers in such a manner that in the pivoted-out state the insert leaf lies with its top side flush with the face of the top side of the basic table leaf.

As in the case of the prior art mentioned above, the table according to the invention also allows in an advantageous manner that apart from the basic table leaf at least one further insert leaf can be placed lying in a row with the one insert leaf, wherein the further insert leaf on its narrow sides comprises guide grooves which correspond to the guide grooves of the one insert leaf in each case with a circular recess and a central holding device, which comprises guide shoulders and guide rollers which correspond on both sides to the guide shoulders and the guide rollers of the lateral holding elements, is mounted in the transition region between the one and the further insert leaf below the basic table leaf. The advantage here is that only one additional central holding device of narrow design which carries the guide shoulders and the guide rollers on both sides is required to mount two insert leaves which lie in a row. A further advantage is that as good as no gap at all exists between insert leaves which lie in a row in the extended state.

In order to avoid a protective cover below the table according to the invention, in the case of a further advantageous development of the table according to the invention, the insert leaf is developed at its bottom end in such a manner that it forms a closed contour with a counter insert leaf. As a result, not only are injuries to the users of the table avoided, but over and above this it is ensured that no dirt is collected at the bottom end of the insert leaves because said dirt falls out downward when the insert leaves are pulled out.

In addition, to increase safety during use of the table according to the invention, it is considered advantageous when the insert leaf is provided at its top end with a lip, by means of which it is made more difficult for objects placed thereon to slide off accidentally.

The lateral holding devices can be realized in various ways in the case of the table according to the invention; for example at least the lateral holding devices can be a component part of in each case a lateral table leg element.

When using the table according to the invention in a coach of a railway vehicle, it is advantageous—as is known per se—when the basic table leaf is supported at least centrally on a table column, where applicable additionally also on a side wall of the coach of the railway vehicle.

In addition, it is considered advantageous when the basic table leaf is supported on the table column by means of a longitudinal bearer. In this case, it is then also possible to fasten the lateral holding devices on the ends of the longitudinal bearer.

However, it can also be advantageous to allow the basic table leaf to rest on a longitudinal bearer which is held on one side on a wall.

BRIEF DESCRIPTION OF THE SEVERAL VIEWS OF THE DRAWING

To explain the invention further, an exemplary embodiment of the expandable table with four supplementary table leaves is shown in FIGS. 1 to 8, wherein.

DESCRIPTION OF THE INVENTION

Figure 1:
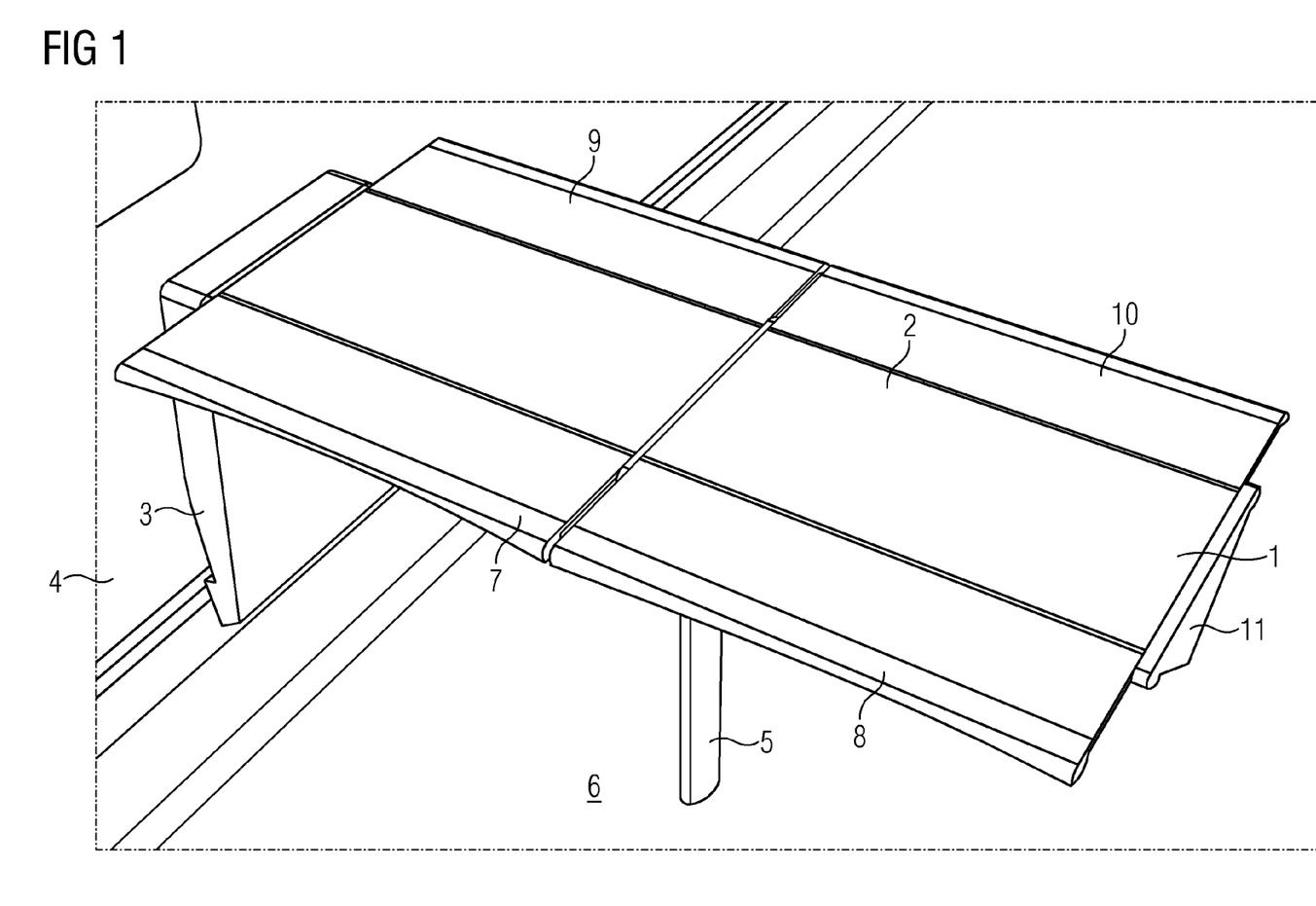
FIG. 1 shows the expandable table with four supplementary table leaves extended

FIG. 1 shows an expandable table 1 which comprises a basic table leaf 2. The basic table leaf 2 is held on the one side by a table leg element 3 on a wall 4 of a coach of a railway vehicle which is otherwise not shown in any more detail. In addition, the basic table leaf 2 rests on a table column 5 which is supported on the floor of the coach of the railway vehicle.

As can be seen additionally in FIG. 1, the expandable table 1 has a supplementary table leaf in the form of an insert leaf 7, with which a further insert leaf 8 lies in a line. Additional insert leaves 9 and 10, which are located opposite the first-mentioned insert leaves 7 and 8, are present opposite said insert plates 7 and 8. All the insert leaves 7 to 10 are lowerable under the basic table leaf 2, to which end holding devices 11 serve, of which only one holding device 11 can be seen in FIG. 1; another holding device is situated on the table leg element 3.

Figure 2:
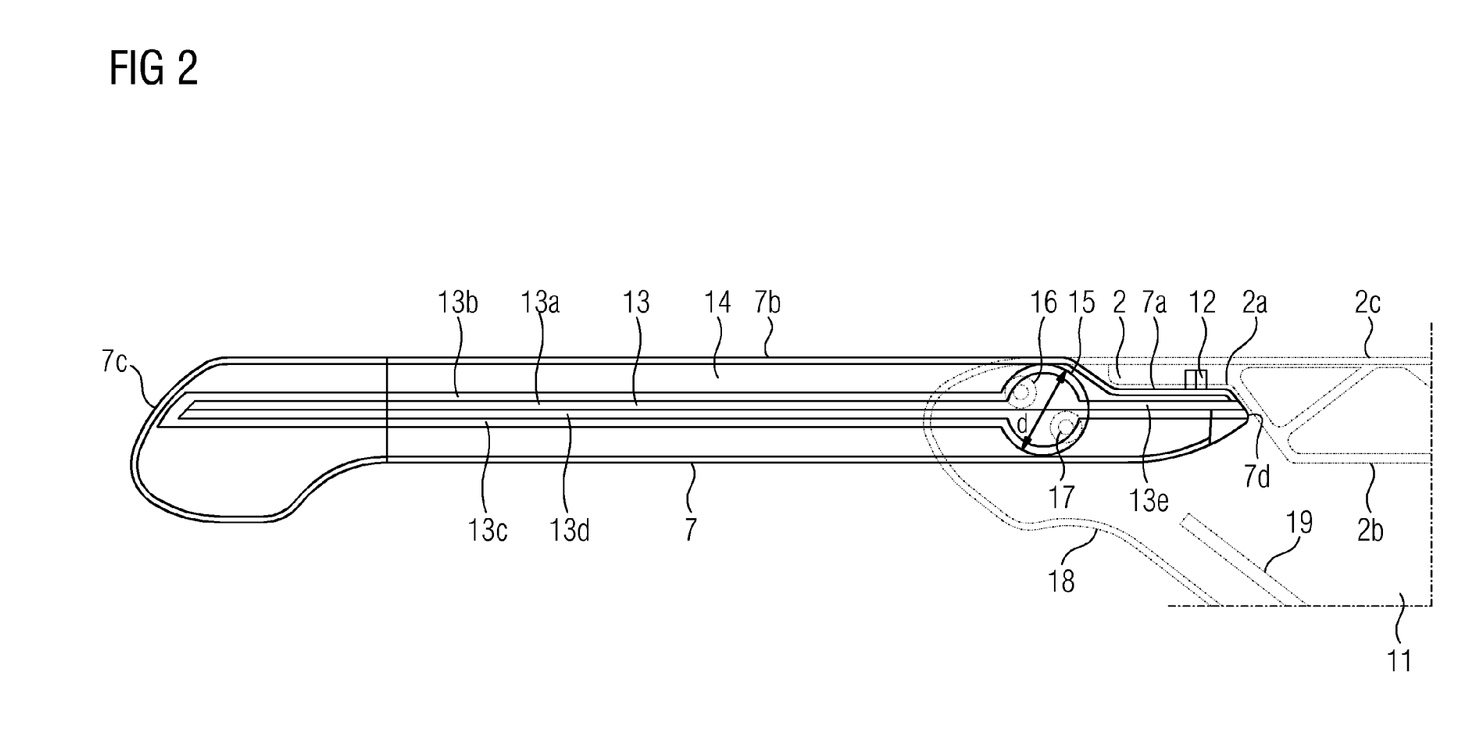
FIG. 2 shows the table with a supplementary table leaf pivoted-out in its position with reference to the basic table leaf and a lateral holding device.

If, for example, the one insert leaf 7 is situated in the position shown in FIG. 1 (extended state), a stop 12 on the insert leaf 7 is then guided from below against the basic table leaf 2—as shown in FIG. 2—and prevents the insert leaf 7 being able to be pulled forward completely under the basic table leaf 2; an indented region 2*a* on the bottom side 2*b* of the basic table leaf 2 ensures together with an indented region 7*a* on the top surface 7*b* of the insert leaf 7 that the insert leaf does not pivot away downward when loaded; in addition, as a result the top surfaces 2*c* and 7*b* of the basic table leaf 2 and the top surface 7*b* of the insert leaf 2 are positioned in a flush manner.

A guide groove 13 which is provided on a transverse side 14 of the insert leaf 7 can also be seen in FIG. 2. Said guide groove 13 extends almost over the entire length of the transverse side 14 as far as beyond the stop 12 up to the bottom end 7*d* of the insert leaf 7 and here is open in the longitudinal direction of the guide groove 13. In the vicinity of the stop 12, the guide groove 13 has a circular recess 15, in which engage guide rollers 16 and 17 which are mounted on a holding device 18 in a manner not shown here. The circular recess 15 forms one component of a pivot bearing, the other component of which is formed by the guide rollers 6 and 17. In its portion 13a from the circular recess 15 as far as up to the top end 7c of the insert leaf 7, the guide groove 13 comprises a c-shaped cross section, by way of which lateral guide paths 13b and 13c are formed for the guide rollers 16 and 17. A longitudinal slot 13d for a guide shoulder 19 on the holding device 18 also extends here. In its portion 13e between the circular recess 15 and a bottom end 7d of the insert leaf 7, the guide groove 13 is realized with a rectangular cross section with a width which corresponds to that of the guide shoulder 19. Consequently, a safety device against the insert leaf 7 being pulled out of the basic table leaf 2 in the horizontal direction is created.

The two guide rollers 16 and 17 are arranged spaced apart from one another such that the wrap diameter thereof corresponds to the diameter d of the circular recess 15. The guide rollers 16 and 17, when reaching the position shown in FIG. 2, are then placed against the inside wall of the circular recess 15 and enable the insert leaf 7 to pivot in a controlled manner out of an inclined position into the position shown in FIG. 2.

The holding device 18 is connected to the table basic leaf 2 in a manner that is not shown. The holding device 18 also caries the guide shoulder 19 which is realized in an elongated manner and gives the direction in which—as will be explained again later—the insert leaf 7 can be pushed inclinedly downward under the basic table leaf 2 after pivoting in the clockwise direction.

Figure 3:
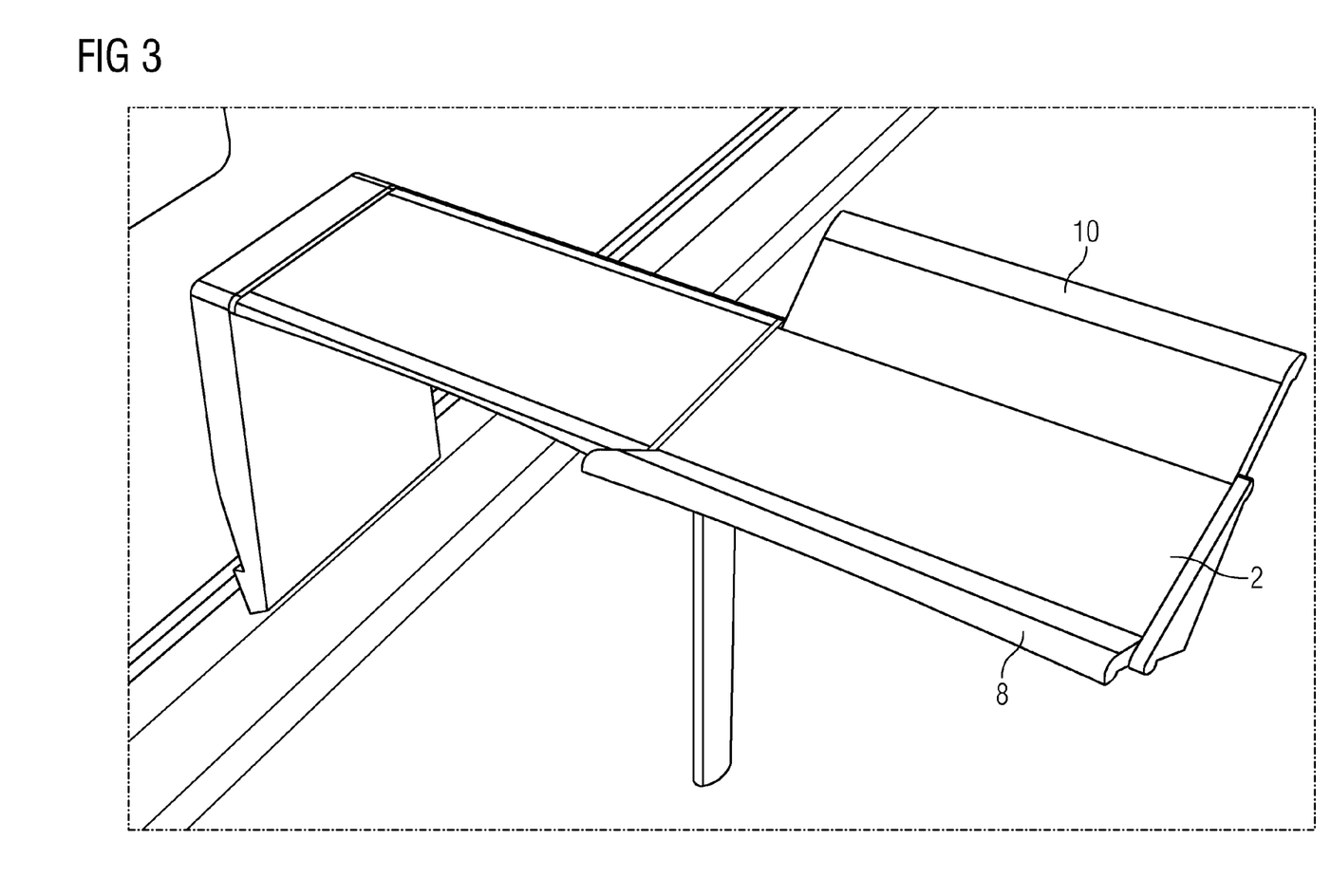
FIG. 3 shows the table with two supplementary table leaves which are located opposite one another and are extended by different amounts.

FIG. 3 shows the expandable table 1 in a state in which the insert leaf 8 is extended relatively little under the basic table leaf 8; it looks different to the further insert leaf 10 which is extended considerably more than the one insert leaf 8.

Figure 4:
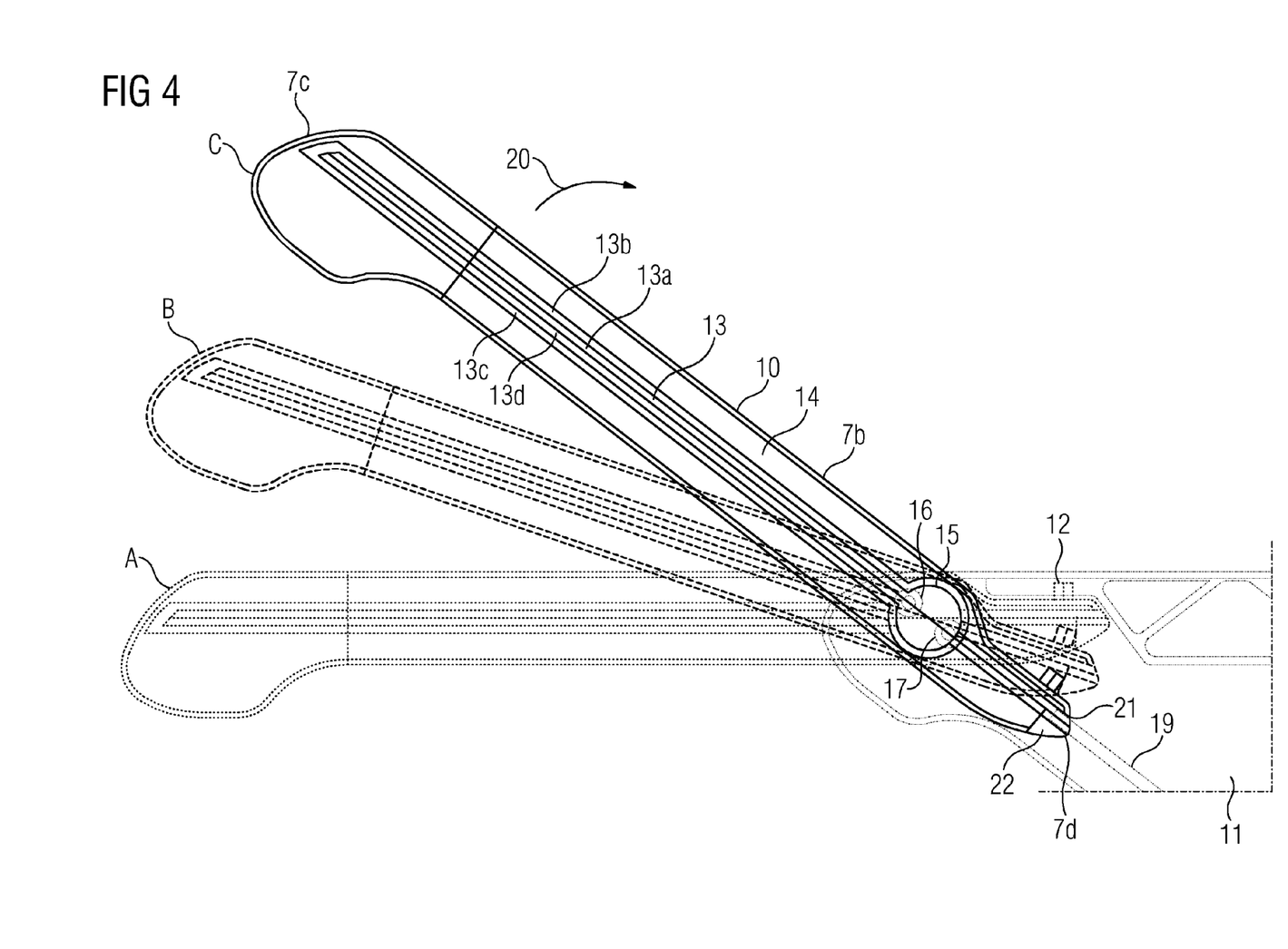
FIG. 4 shows a side view of the supplementary table leaf in different positions with reference to the basic table leaf and a holding device.

FIG. 4, which is to be looked at in conjunction with FIG. 3, shows that the further insert leaf 10 is already situated in a position C, in which the insert leaf 10 has been pivoted after pivoting in the direction of the arrow 20 from a position A via a position B into the position C, in which the open end 21 of the guide groove 13 lies in front of the guide shoulder 19. In this case, an alignment recess 22 at the bottom end 7d of the insert leaf 7 serves to align the guide groove 13 with reference to the guide shoulder 19.

Figure 5:
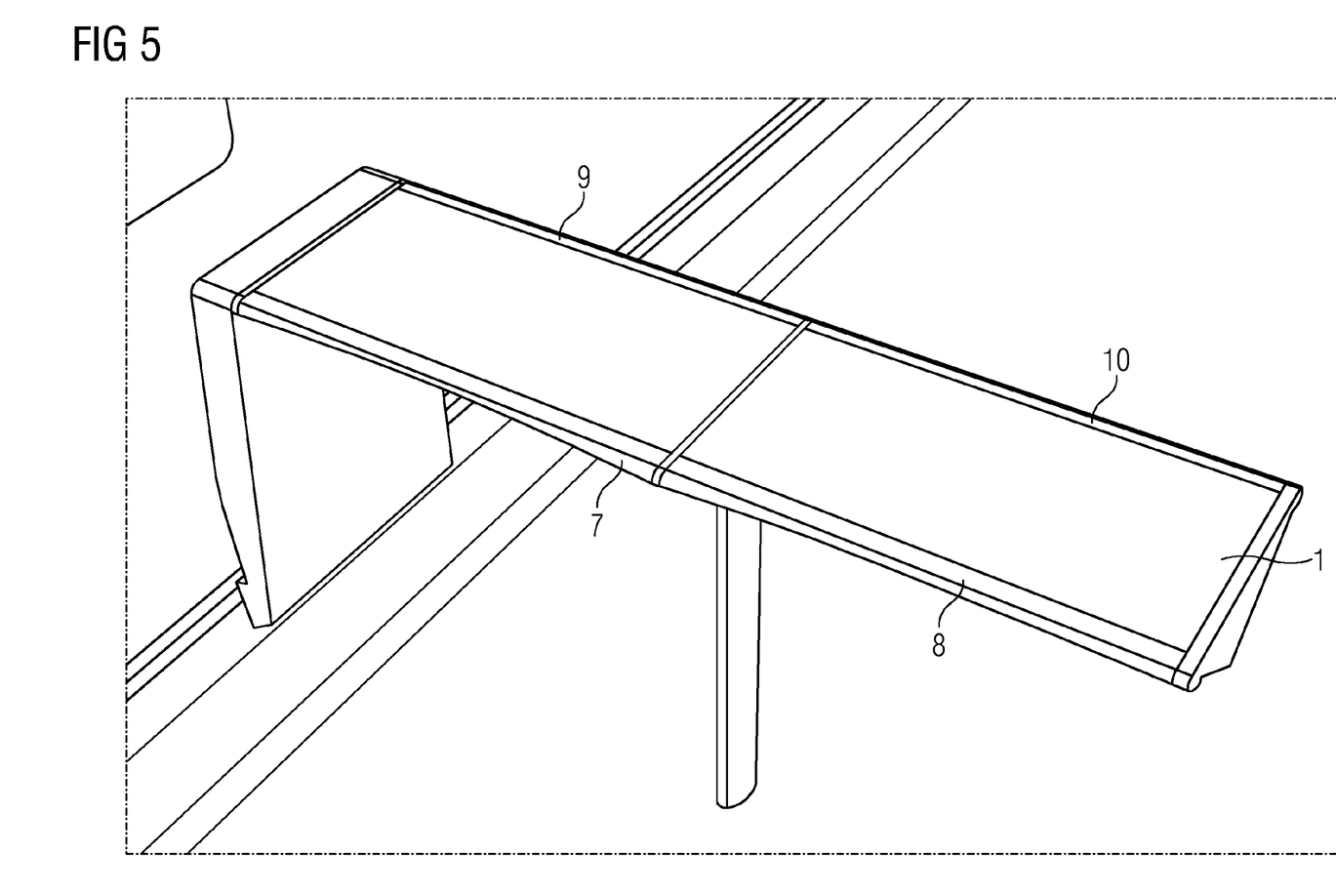
FIG. 5 shows the table with the supplementary table leaves completely inserted.

FIG. 5 shows the expandable table 1 in a state in which all of the insert leaves 7, 8, 9, 10 are completely lowered or inserted.

Figure 6:
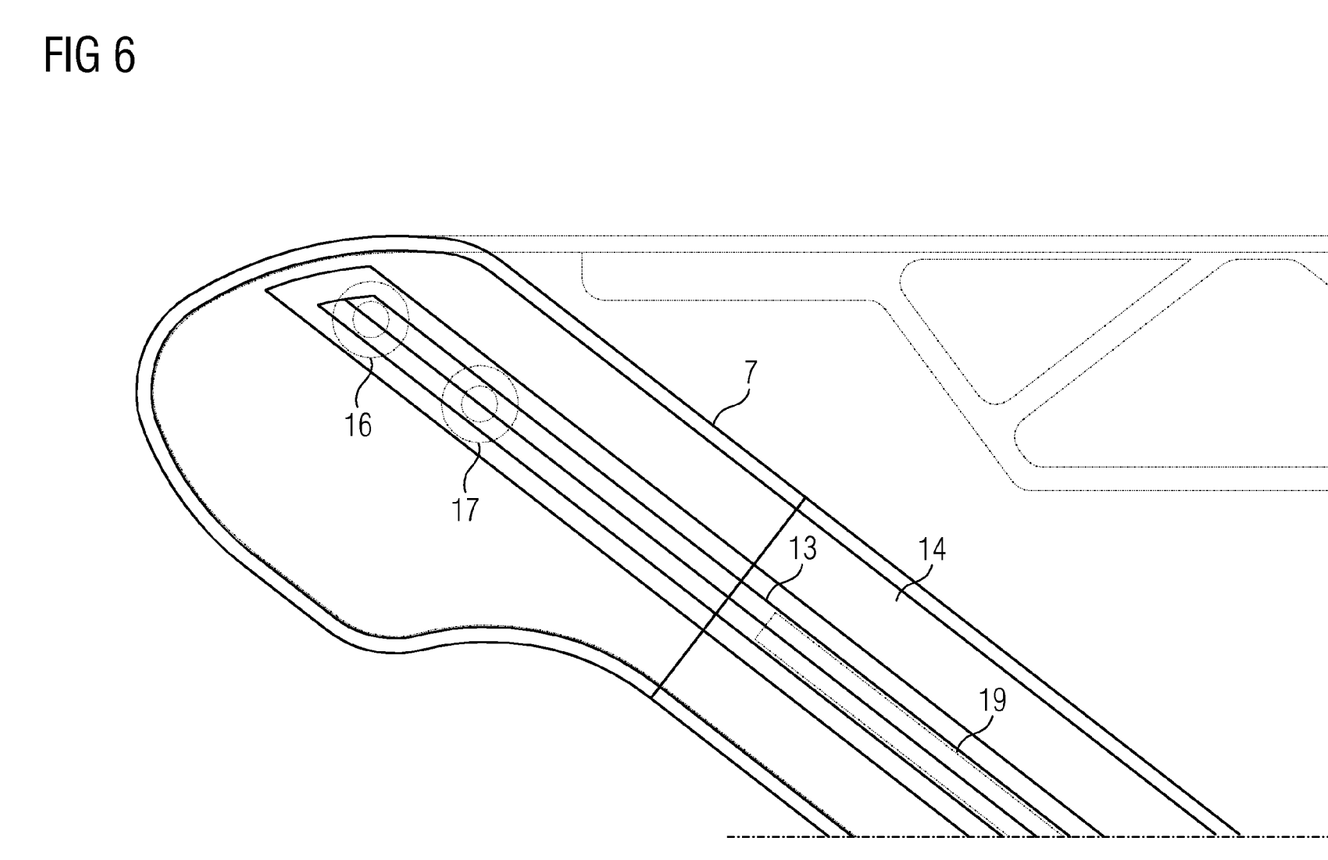
FIG. 6 shows a detail from the supplementary table leaf, the basic table leaf and a holding device.

FIG. 6 shows that in this state, for example, the insert leaf 7 is situated in a position in which the guide rollers 16 and 17 lie far outside the circular enlargement 15 of the guide groove 13; the circular enlargement 15 on the narrow side 14 of the insert leaf 7 then lies outside the bottom end of the guide shoulder 19.

Figure 7:
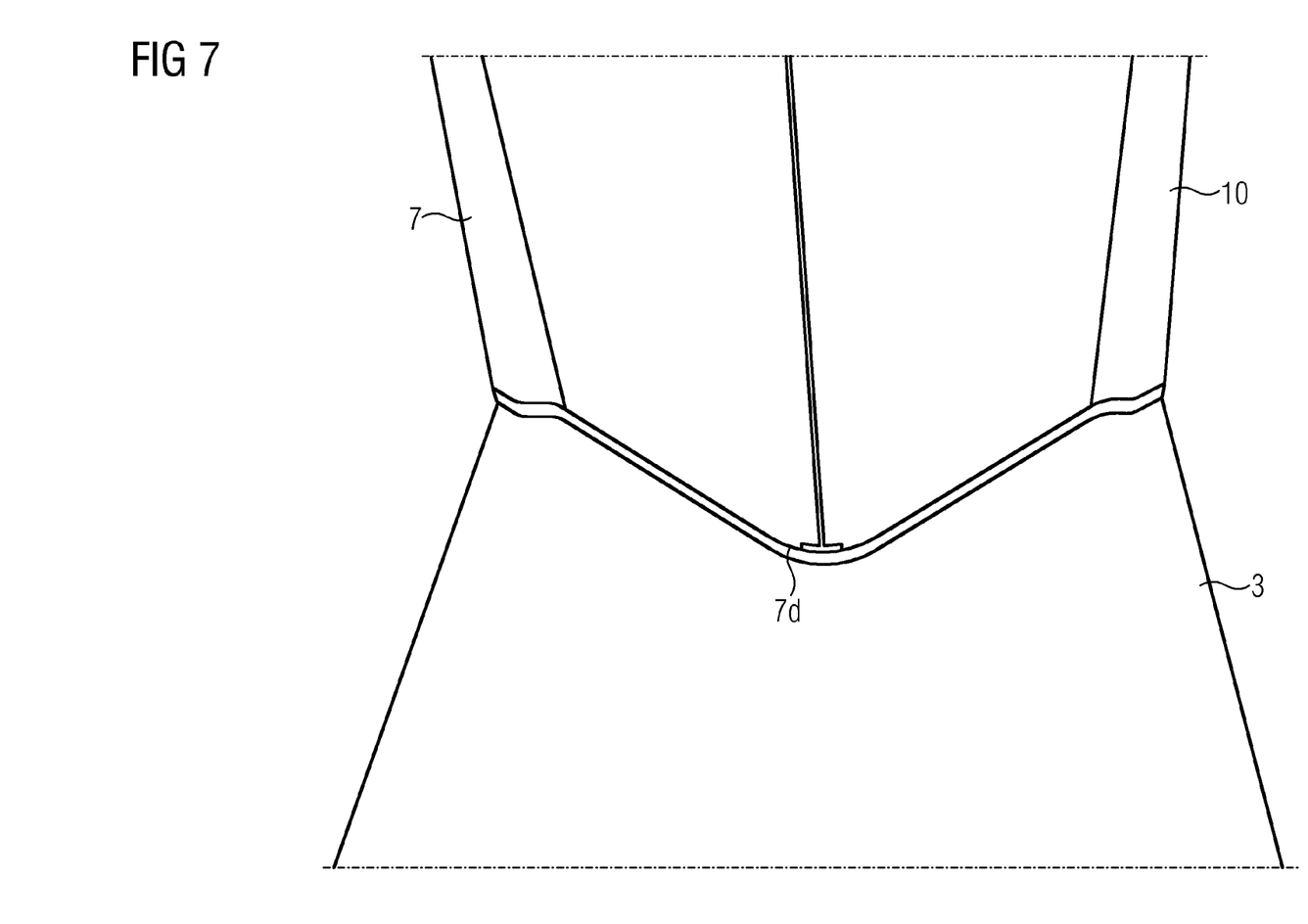
FIG. 7 shows a view from below of the table with the supplementary table leaves inserted and FIG. 8 shows a further view from below of the table with two supplementary table leaves extended.

FIG. 7 gives a view from below of two insert leaves which are located opposite one another, for example the insert leaves 8 and 10 again. It can be seen that the insert leaves are formed at the bottom end 7d such that they form a closed contour under the basic table leaf 2 and consequently protect the user from injuries. An additional protective housing is not necessary. If one of the insert leaves is pulled upward, the space at the bottom of the insert leaves is automatically emptied and dirt collected there can simply be swept out from under the table 1. Once again the table leg element 3 can be seen here, not however the holding device located thereon on which the guide rollers and guide shoulders are mounted.

Figure 8:
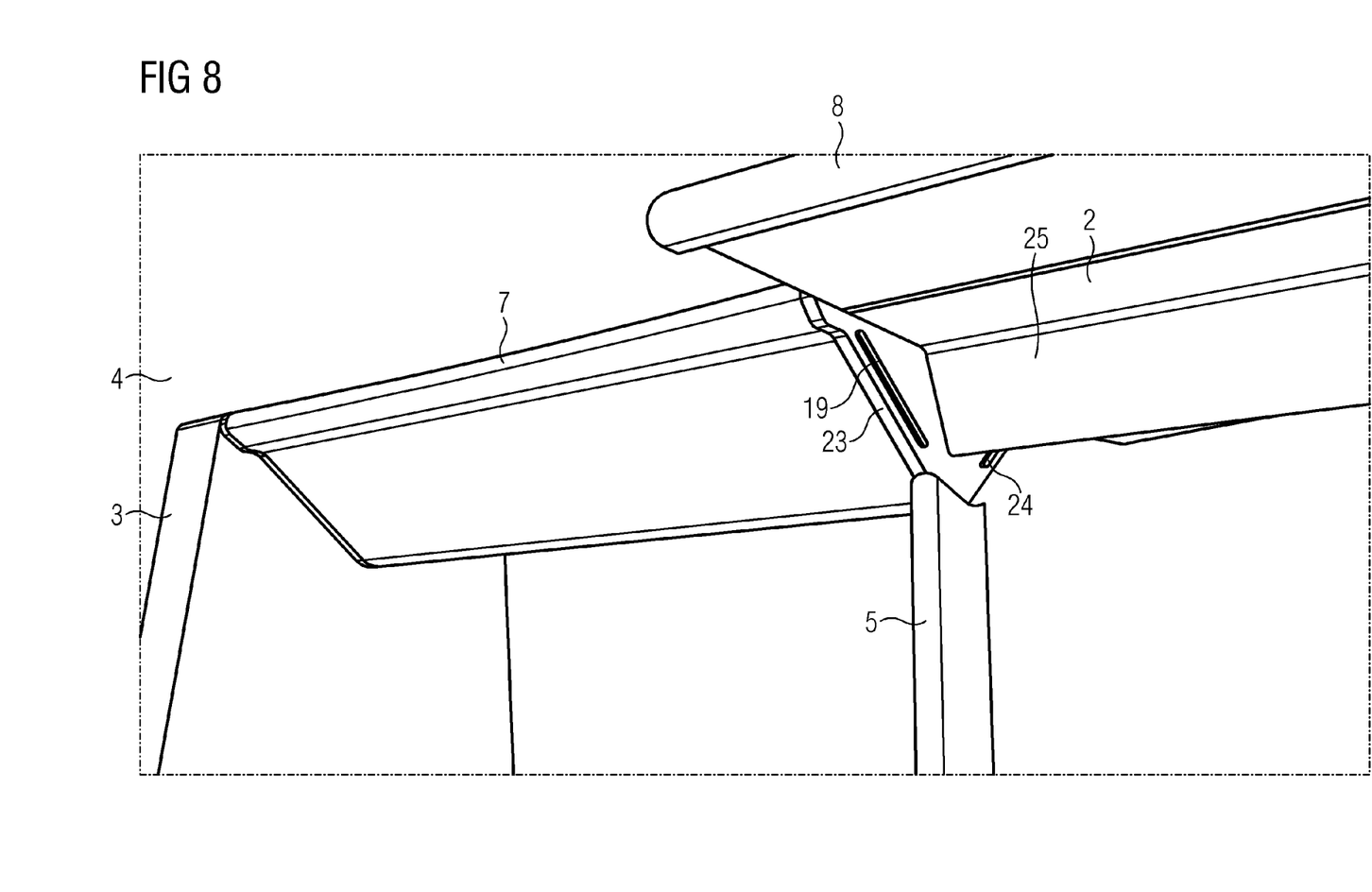

The supplementary FIG. 8 shows a side view of the table 1 with one insert leaf 7 inserted and one insert leaf 8 extended. It can easily be seen here that between the insert leaves 7 and 8 as well as 9 and 10 there is a central holding device 23, which on one side comprises the guide shoulder 19, a further guide shoulder 24 and, in the region of the in each case top end of the two shoulders, the guide rollers 16 and 17 which are not shown here for graphic reasons; the other side of the central holding device 23 is realized in a corresponding manner. Said representation also shows that below the basic table leaf 2 extends a longitudinal bearer 25, which, at its free end, in the region of the insert leaves 8 and 10, comprises the lateral holding device 11—not shown here—which comprises corresponding guide shoulders like the central holding device 23.

The invention claimed is:

1. An expandable table, comprising:
    a basic table leaf;
    at least one supplementary insert table leaf configured to be placed next to said basic table leaf and guided obliquely downward under said basic table leaf, said insert leaf having two transverse sides and a bottom end; and
    pivot bearings each having one component formed by a circular recess and carried at a respective one of said transverse sides at said bottom end of said insert leaf and a further component formed by two guide rollers located diametrically opposite one another, connected to said basic table leaf and engaging in said one component with said insert leaf extended to complete said pivot bearing.

2. The table according to claim 1, wherein said insert leaf has a guide groove formed therein being open at least at one end, said circular recess is a circular enlargement lying centrally within a course of said guide groove, and a guide shoulder is disposed below said basic table leaf, extends obliquely downward and is configured to be accommodated in said guide groove from said open end thereof.

3. The table according to claim 2, wherein said bottom end of said insert leaf has an alignment recess at least in vicinity of next to said guide groove, and said insert leaf, when pivoting back into a position pointing obliquely downward, is placed against said guide shoulder and aligns said guide groove with said guide shoulder.

4. The table according to claim 2, wherein:
    said insert leaf has a top end;
    said guide shoulder has a width;
    said guide groove has a portion between said circular recess to said top end of said insert leaf;
    said portion has a C-shaped cross section forming a lateral guide path for said oppositely disposed guide rollers and forming an elongated slot for accommodating said guide shoulder; and
    said guide groove has another portion between said circular recess and said bottom end of said insert leaf having a rectangular cross section with a width corresponding to said width of said guide shoulder.

5. The table according to claim 2, which further comprises two lateral holding devices mounted below said basic table leaf and each having one guide shoulder and said two guide rollers.

6. The table according to claim 5, wherein:
    said basic table leaf has a top surface;
    said two guide rollers are each mounted on said holding devices to fit under said top surface of said basic table leaf; and
    said circular recess of said guide groove is positioned next to said open end of said guide groove and said guide shoulder is positioned on said holding device to permit said insert leaf to pivot freely when said circular recess lies next to said guide rollers.

7. The table according to claim 6, wherein said insert leaf has an indented top side between said circular recesses, and said basic table leaf has an indented bottom side between said guide rollers, causing said top side of said insert leaf to lie flush with said top surface of said basic table leaf in a pivoted-out state of said insert leaf.

8. The table according to claim 5, which further comprises:
- at least one further insert leaf configured to lie in a row with said at least one supplementary insert table leaf;
- said further insert leaf having transverse sides with guide grooves each corresponding to a respective one of said guide grooves of said at least one supplementary insert table leaf with a circular recess and a central holding device;
- said central holding device having guide shoulders and guide rollers corresponding on two sides to said guide shoulders and said guide rollers of said lateral holding devices; and
- said central holding device being mounted in a transition region between said at least one supplementary insert table leaf and said further insert leaf below said basic table leaf.

9. The table according to claim 5, which further comprises lateral table leg elements, at least said lateral holding devices each being a component part of a respective one of said lateral table leg elements.

10. The table according to claim 5, which further comprises a table column at least centrally supporting said basic table leaf.

11. The table according to claim 10, which further comprises a longitudinal bearer, said basic table leaf being supported on said table column by said longitudinal bearer.

12. The table according to claim 11, wherein said lateral holding devices are fastened on ends of said longitudinal bearer.

13. The table according to claim 1, wherein said circular recess has a diameter, and said two guide rollers are separated by a spacing providing a wrap diameter corresponding to said diameter of said circular recess.

14. The table according to claim 1, which further comprises a counter insert leaf, said insert leaf being developed at said bottom end thereof to form a closed contour with said counter insert leaf.

15. The table according to claim 1, wherein said insert leaf has a top end with a lip.

16. The table according to claim 1, which further comprises a longitudinal bearing body held on one side on a wall, said basic table leaf resting on said longitudinal bearing body.

* * * * *

UNITED STATES PATENT AND TRADEMARK OFFICE
CERTIFICATE OF CORRECTION

| | | |
|---|---|---|
| PATENT NO. | : 9,205,848 B2 | Page 1 of 1 |
| APPLICATION NO. | : 14/361355 | |
| DATED | : December 8, 2015 | |
| INVENTOR(S) | : Benno Schiefer | |

It is certified that error appears in the above-identified patent and that said Letters Patent is hereby corrected as shown below:

IN THE CLAIMS

Column 6, lines 32-37 (claim 3) should read as follows:

> 3. The table according to claim 2, wherein said bottom end of said insert leaf has an alignment recess at least next to said guide groove, and said insert leaf, when pivoting back into position pointing obliquely downward, is placed against said guide shoulder and aligns said guide groove with said guide shoulder.

Signed and Sealed this
Sixteenth Day of February, 2016

Michelle K. Lee
*Director of the United States Patent and Trademark Office*